US012704461B2

(12) United States Patent
Huang et al.

(10) Patent No.: US 12,704,461 B2
(45) Date of Patent: Aug. 11, 2026

(54) STIMULATED RAMAN SCATTERING TOMOGRAPHY SYSTEM AND METHOD

(71) Applicant: NATIONAL UNIVERSITY OF SINGAPORE, Singapore (SG)

(72) Inventors: Zhiwei Huang, Singapore (SG); Li Gong, Singapore (SG); Shulang Lin, Singapore (SG)

(73) Assignee: National University of Singapore, Singapore (SG)

( * ) Notice: Subject to any disclaimer, the term of this patent is extended or adjusted under 35 U.S.C. 154(b) by 99 days.

(21) Appl. No.: 18/563,631

(22) PCT Filed: May 23, 2022

(86) PCT No.: PCT/SG2022/050340
§ 371 (c)(1),
(2) Date: Nov. 22, 2023

(87) PCT Pub. No.: WO2022/250610
PCT Pub. Date: Dec. 1, 2022

(65) Prior Publication Data

US 2024/0241057 A1 Jul. 18, 2024

(30) Foreign Application Priority Data

May 24, 2021 (SG) ........................... 10202105493U

(51) Int. Cl.
*G01N 21/65* (2006.01)
*G01N 21/47* (2006.01)
*G02B 21/33* (2006.01)

(52) U.S. Cl.
CPC ......... *G01N 21/65* (2013.01); *G01N 21/4795* (2013.01); *G02B 21/33* (2013.01);
(Continued)

(58) Field of Classification Search
CPC ............... G01N 21/65; G01N 21/4795; G01N 2021/655; G01N 2201/06113;
(Continued)

(56) References Cited

U.S. PATENT DOCUMENTS 4,812,682 A * 3/1989 Holmes ..................... G02F 3/00 372/28
2011/0122488 A1* 5/2011 Truong .............. G01N 21/6408 359/385
(Continued)

FOREIGN PATENT DOCUMENTS

CN 108802008 A 11/2018
CN 208872669 U * 5/2019
(Continued)

OTHER PUBLICATIONS

Chen, X., Zhang, C., Lin, P. et al. Volumetric chemical imaging by stimulated Raman projection microscopy and tomography. Nat Commun 8, 15117 (2017) (Year: 2017).*
(Continued)

*Primary Examiner* — Kara E. Geisel
*Assistant Examiner* — Christina I Xing
(74) *Attorney, Agent, or Firm* — KDW Firm PLLC

(57) ABSTRACT

A stimulated Raman scattering tomography system includes means for generating a first input light beam, means for generating a second input light beam, an objective, a condenser and a detector. The first input light beam is phase-modulated while the second input light beam is amplitude-modulated. The objective is configured to direct the first and second input light beams onto a sample. The condenser is configured to collect an output light beam from the sample. The is detector configured to detect at least a portion of the output light beam corresponding to the first input light beam. The system further includes means for forming a depth-
(Continued)

resolved image of the sample from the detected portion of the output light beam.

15 Claims, 10 Drawing Sheets

(52) U.S. Cl.
CPC .................. *G01N 2021/655* (2013.01); *G01N 2201/06113* (2013.01); *G01N 2201/0675* (2013.01); *G01N 2201/0697* (2013.01)

(58) Field of Classification Search
CPC ... G01N 2201/0675; G01N 2201/0697; G02B 21/33; G02B 21/008
See application file for complete search history.

(56) References Cited

U.S. PATENT DOCUMENTS

2012/0307238 A1* 12/2012 Fujita .................. G02B 21/002 356/338
2018/0238738 A1 8/2018 Alfano
2018/0372632 A1* 12/2018 Min .................. G01N 33/5005

FOREIGN PATENT DOCUMENTS

CN 110208241 A 9/2019
CN 111665232 A 9/2020
CN 212489863 U 2/2021
WO WO-03062802 A2 * 7/2003 .......... A61B 5/6852
WO 2021140943 A1 7/2021

OTHER PUBLICATIONS

Bae K, Zheng W, Huang Z. Spatial light-modulated stimulated Raman scattering (SLM-SRS) microscopy for rapid multiplexed vibrational imaging. Theranostics. Jan. 1, 2020;10(1):312-322. (Year: 2020).*
Liu, Hsiou-Yuan et al. "Multiplexed phase-space imaging for 3D fluorescence microscopy." Optics express 25 13 (2017): 14986-14995 . (Year: 2017).*
International Search Report and Written Opinion mailed Oct. 10, 2022 for corresponding PCT/SG2022/050340 (12 pages).
Gong et al., "Stimulated Raman Scattering Tomography Enables Label-Free Volumetric Deep Tissue Imaging", Jul. 17, 2021 https://doi.org/10.1002/lpor.202100069.
Bae et al, "Spatial light-modulated stimulated Raman scattering (SLM-SRS) microscopy for rapid multiplexed vibrational imaging", Theranostics. 2020; 10(1): 312-322. Published online Jan. 1, 2020. doi: 10.7150/thno.38551.

* cited by examiner

STIMULATED RAMAN SCATTERING TOMOGRAPHY SYSTEM AND METHOD

This application is a national stage application in the U.S. filed under 35 U.S.C. § 371 of pending International Patent Application No. PCT/SG2022/050340 filed 23 May 2022, which claims priority to Singapore Patent Application No. 10202105493U filed 24 May 2021, the entireties of which applications are hereby incorporated by reference herein.

TECHNICAL FIELD

The present disclosure relates broadly, but not exclusively, to stimulated Raman scattering tomography systems and methods.

BACKGROUND

Three-dimensional (3D) optical microscopy (e.g., confocal microscopy, multiphoton microscopy, and harmonic generation microscopy) is a powerful imaging tool to deliver important data on the spatio-temporal information (e.g., structures and architectures, metabolic functions, neuron networks, cell division and migration, etc) about living tissue and cells. The conventional 3D volumetric data can be acquired via point-by-point or line-scan mechanically across the z-direction through either scanning the objective lens or the sample stage for acquiring a series of two-dimensional (2D) section images (e.g., raster scan). The major limitation of conventional 3D microscopy imaging techniques is that the tightly focused Gaussian beam typically used for point-scan encounters strong light scattering due to the refractive index discontinuity in turbid media (e.g., tissue), suffering from a limited light penetration (~100-200 μm), thus incapable of volumetric deep tissue imaging. To mitigate the scattering effect, the non-diffracting Bessel beam with an inherent self-reconstructing ability after scatters encountered along its propagation path has been utilized to aid penetration in deep regions of turbid tissue where diffraction and scatterings are dominant in advanced 3D imaging techniques (e.g., light-sheet microscopy, two-photon microscopy, optical coherence microscopy). However, Bessel beam microscopy generally provides the projection image of the sample, in which the depth information is lost.

Stimulated Raman Scattering (SRS) microscopy is an emerging label-free chemical imaging technique with biomolecular specificity that has found wide applications in biological and biomedical systems. To improve the imaging depth for conventional Gaussian beam SRS 3D imaging, optical projection tomography (OPT) coupled with Bessel beams excitation has been used to retrieve 3D SRS image from a series of 2D images at multiple projection angles, but OPT-based SRS 3D imaging still requires to mechanically rotate the sample stage or incident light beams, which is not suitable for rapid in vivo biological/biomedical applications.

A need therefore exists to provide a tomography system and method that can address at least some of the above problems.

SUMMARY

According to a first aspect, there is provided a stimulated Raman scattering tomography system comprising means for generating a first input light beam, wherein the first input light beam is phase-modulated; means for generating a second input light beam, wherein the second input light beam is amplitude-modulated; an objective configured to direct the first and second input light beams onto a sample; a condenser configured to collect an output light beam from the sample; a detector configured to detect at least a portion of the output light beam corresponding to the first input light beam; and means for forming a depth-resolved image of the sample from the detected portion of the output light beam.

According to a second aspect, there is provided a stimulated Raman scattering tomography method comprising generating a first input light beam, wherein the first input light beam is phase-modulated; generating a second input light beam, wherein the second input light beam is amplitude-modulated; directing the first and second input light beams onto a sample; collecting an output light beam from the sample; detecting at least a portion of the output light beam corresponding to the first input light beam; and forming a depth-resolved image of the sample from the detected portion of the output light beam.

There is also disclosed a three-dimensional volumetric imaging method comprising the method of the second aspect.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

The present disclosure relates to z-scan-free SRS tomography (SRST) which is enabled by optical beating technique (OBT) associated with non-diffracting zero-order Bessel beams to realize 3D SRS deeper chemical imaging without a need for a mechanical scan of the sample or the objective lens. In SRST, the sample is illuminated by Bessel beams with tunable optical beating patterns generated by using a spatial light modulator (SLM), which encodes the depth-resolved chemical information of the sample in spatial frequency domain. The 3D SRS tomograms can be rapidly retrieved by implementing an inverse fast Fourier transform (IFFT). The present disclosure also shows the derivation and analysis of the unique Bessel beam OBT-based SRST imaging method theoretically, and also the development of the Bessel beam OBT-based SRST imaging system to experimentally demonstrate the capability of SRST for label-free volumetric deeper chemical imaging on a variety of samples (e.g., polymer beads phantom, Raman-active crystals, plant cells, and biological tissue).

Figure 1:
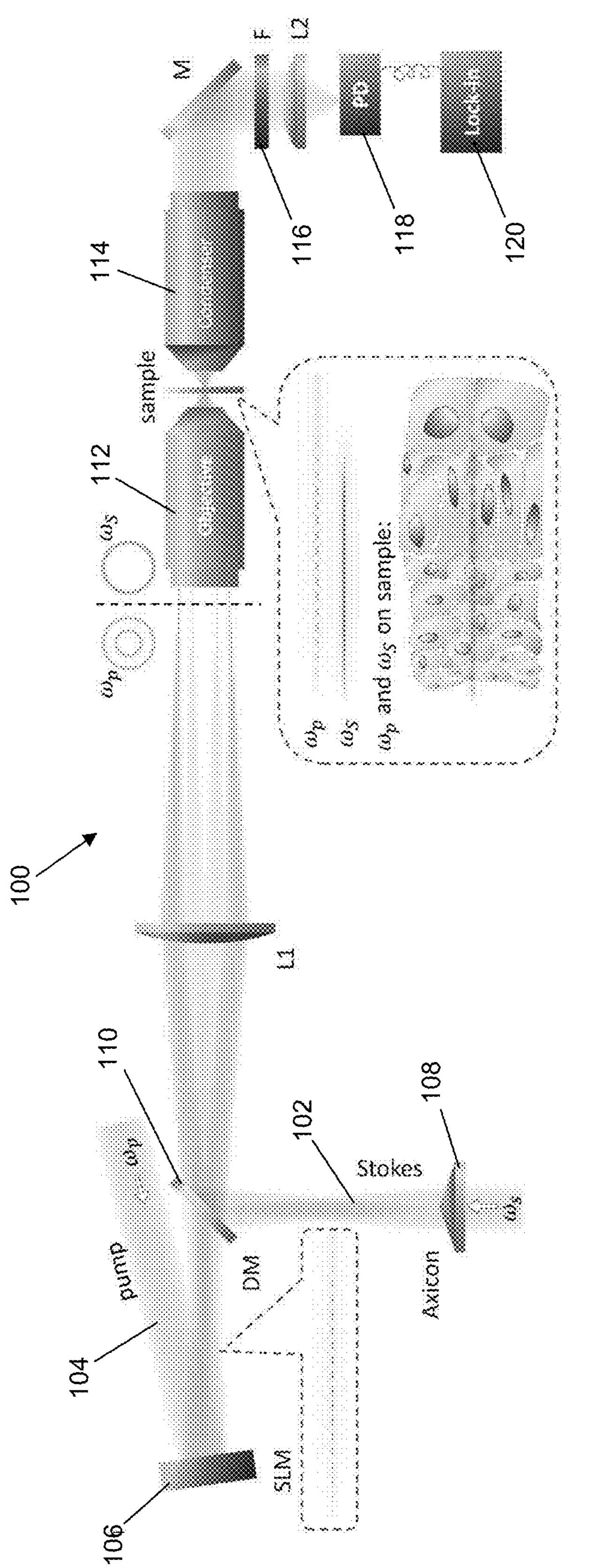
FIG. 1 shows a schematic diagram of a SRST imaging system according to an example embodiment.

FIG. 1 shows a schematic diagram of a SRST imaging system 100 according to an example embodiment. A femtosecond (fs) laser source (Insight DS dual, Spectra-Physics—not shown) which has two laser outputs (one at 1041 nm is used as Stokes beam 102; the other tunable output (680~1300 nm) serves as pump beam 104) is used for tissue excitation in SRST imaging. Both the pump and Stokes beams 104, 102 are of approximately 100 fs pulsewidths operating at 80 MHz repetition rates. The pump beam 104 is phase modulated by a spatial light modulator (SLM) 106 (PLUTO BB, Holoeye). The Stokes beam 102 is converted to a Bessel beam by using an axicon 108 (AX251-B, Thorlabs) and amplitude-modulated at 20 MHz by an electro-optic modulator (EOM) (APE-Berlin—not shown). The pump and Stoke beams 104, 102 are combined using a dichroic mirror 110. The ring patterns on the focal plane of lens L1 (f=100 mm) that receives that pump and Stokes beams 104, 102 are imaged onto galvo mirrors of a multiphoton scanning microscope (MPM-4R, Thorlabs) through a 4-f system, and then further projected onto a back aperture of a water immersion microscope objective 112 (Apo LWD 25X, 1.10 w, Nikon) through another internal 4-f system in the microscope. In the forward direction, a condenser 114 (CC Achromat/Aplanat, N.A.=1.4, Nikon) is used to collect the transmitted pump beam and the transmitted Stokes beam. The transmitted pump beam is spectrally isolated from the transmitted Stokes beam using a bandpass filter set 116 (Semrock) (i.e. the transmitted Stokes beam is blocked off), and detected by a large area photodiode 118 (FDS1010, Thorlabs). A lock-in amplifier 120 (APE-Berlin) is used to demodulate the filtered pump beam to acquire an SRS signal (i.e., stimulated Raman loss (SRL)) from the sample. A depth-resolved SRST image can be rapidly retrieved from the SRS signal, e.g., by implementing an inverse fast Fourier transform.

In SRS imaging, the sample is illuminated by the collinear pump beam ($\omega_p$) and Stokes beam ($\omega_S$) ($\omega_S<\omega_p$) under a tight focusing through a high numerical aperture (N.A.) objective lens. The SRS signal generated is proportional to the product of the pump and Stokes beam intensities, $I_pI_S$. If both the pump and Stokes excitation beams are the Bessel beams to excite the sample, their intensity distributions can be expressed as $I_\rho(r, z)=I_\rho(z)|J_0(k_{r\rho}r)|^2$, where ρ can be p (pump) or S (Stokes). $I_\rho(z)$ is the intensity distribution along the axial direction, $J_0(k_{r\rho}r)$ is the zero-order Bessel function of the first kind; $k_{r\rho}$ is the transverse wavevector, r is the transverse coordinate. Since the Bessel beam is a very thin needle beam, by ignoring its transverse dimension, the 2D projection SRS image F(x, y) of the 3D sample $f(x, y, z)$ can be expressed:

$$F(x, y) = \int_{-\infty}^{\infty} f(x, y, z)I_p(z)I_S(z)dz \tag{1}$$

Optical beating technique (OBT) requires that the Bessel pump beam contain the beating patterns with spatial frequency $\Delta k_z$, i.e., $I_p(z)$ becomes $I_p(z)[\cos(\Delta k_z z)+1]$, and then the 2D projection $F(x, y, \Delta k_z)$ will reflect the depth information of the sample in spatial frequency domain as follows:

$$F(x, y, \Delta k_z) = \int_{-\infty}^{\infty} f(x, y, z)I_p(z)I_S(z)[\cos(\Delta k_z z)+1]dz \tag{2}$$

In $\Delta k_z$ space, the frequency of the cosine function in Eq. (2) is proportional to z, i.e., the object at deeper z oscillates faster in $\Delta k_z$ space. Its inverse Fourier transform is $$g(x, y, z') = \frac{1}{2\pi}\int_{\Delta k_{z,min}}^{\Delta k_{z,max}} F(x, y, \Delta k_z)e^{i\Delta k_z z'}d\Delta k_z = [f(x, y, z')I_p(z')I_S(z') + f(x, y, -z')I_p(-z')I_S(-z') + C\delta(z')] * \frac{1}{2}sinc\left[\frac{(\Delta k_{z,max}-\Delta k_{z,min})z'}{2}\right] \tag{3}$$

where $\Delta k_z$ is ranging from $$\Delta k_{z,min} \text{ to } \Delta k_{z,max},\ C = 2\int_{-\infty}^{\infty} f(x, y, z)I_p(z)I_S(z)dz,$$

"*" denotes convolution. The three terms on the right side of Eq. (3) represent the retrieved image $f(x, y, z')I_p(z')I_S(z')$, mirror image $f(x, y, -z')I_p(-z')I_S(-z')$ and a direct current (DC) component $C\delta(z')$, respectively. The reconstructed 3D image $f(x, y, z')$ can be obtained by normalizing to the illumination function $I_p(z')I_S(z')$, but omitting the mirror image and the DC component.

The axial resolution is determined by the sinc function in Eq. (3), in which the full width at half maximum (FWHM) is $$\Delta z' = \frac{2.41\pi}{\Delta k_{z,max}-\Delta k_{z,min}} \tag{4}$$

The axial resolution is inversely proportional to the beating frequency range of $$\Delta k_{z,max}-\Delta k_{z,min}.$$

With reference to FIG. 1, the SLM 106 is used to impose phase patterns on the pump beam 104 for Bessel beam generation. A Bessel pump beam 104 with optical beating patterns can be formed after SLM 106, resulting in the two concentric rings appearing on the back aperture of the microscope objective. Eventually, the Bessel pump beam's optical beating pattern is projected onto the sample through a 4-f system (L1 and the microscope objective lens 112). On the back aperture of the objective 112, the Bessel Stokes beam 102 forms a single ring. The product of these two beams still possesses the beating patterns in the sample.

Figure 2:
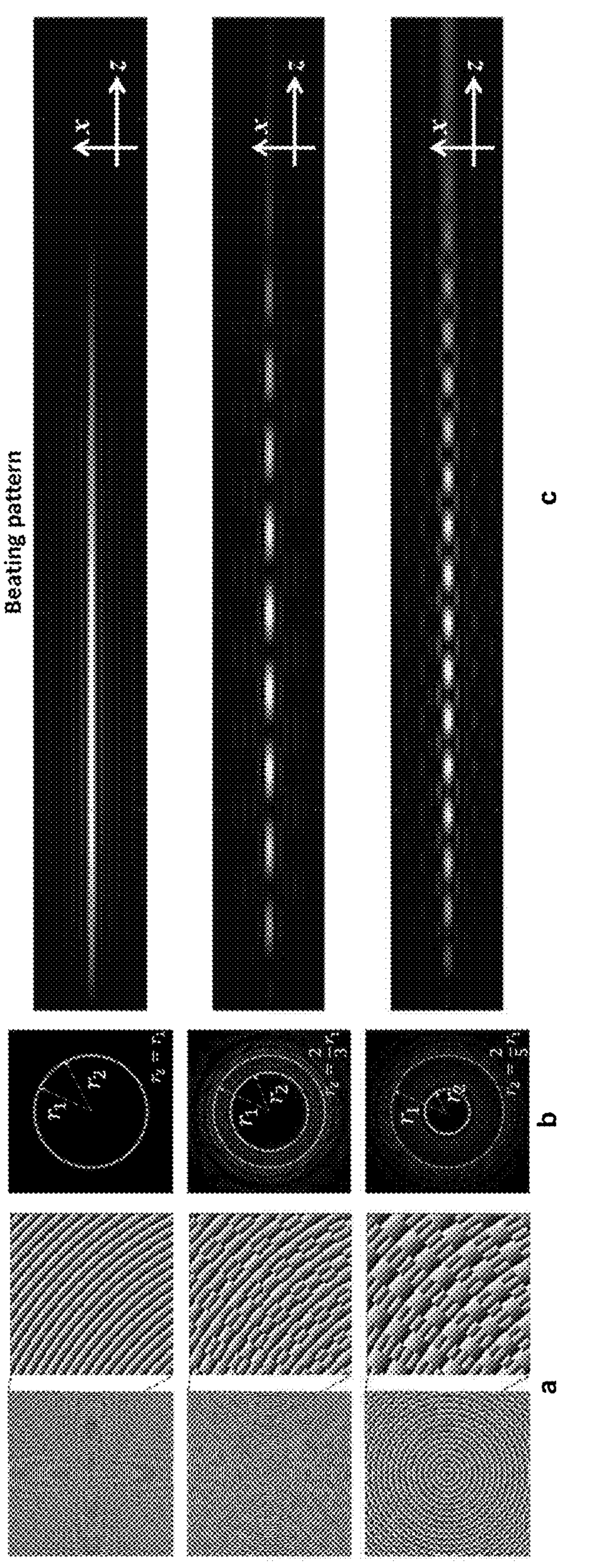
FIG. 2, comprising 2*a*-2*c*, shows examples of phase modulation and the resulting light beams with beating patterns.

To elucidate the mechanism of the beating pattern generations in OBT for SRST, FIG. 2*a* displays some examples of the phase pattern on SLM 106. In an example implementation, the phase pattern is made up of the two axicon phases with different converging angles. The corresponding intensity distributions on the back aperture of the microscope objective 112 are also shown (see rings in FIG. 2*b*). The radii of the outer and inner rings are $r_1$ and $r_2$, respectively. Each ring generates a Bessel beam on the sample after passing through microscope objective lens. The two superimposed Bessel beams have different axial wave-vectors, i.e., $$k_{z1} = \frac{2\pi n}{\lambda_p}\cos(\alpha), \text{ while } k_{z2} = \frac{2\pi n}{\lambda_p}\cos(\beta),$$

where $\lambda_p$ is the pump wavelength, n is the refractive index of the sample, $$\sin(\alpha) = \frac{r_1 N.A.}{R.n} \text{ and } \sin(\beta) = \frac{r_2 N.A.}{R.n},$$

R is the radius of the back aperture of the objective lens. Their interference results in optical beating patterns along the Bessel beam in the sample. The beating frequency $\Delta k_z$ is:

$$\Delta k_z = k_{z2} - k_{z1} = \frac{2\pi n}{\lambda_p}[\cos(\beta) - \cos(\alpha)] \quad (5)$$

According to Eq. (5), the beating frequency $\Delta k_z$ is tunable by changing either $r_1$ or $r_2$. The corresponding beating Bessel beams with beating patterns are shown in FIG. 2*c*.

Similar to frequency domain-optical coherence tomography (FD-OCT), Eq. (3) comprises a retrieved image, a mirror image and a DC component. In FD-OCT, they may be overlapped with each other, making the retrieved image undistinguishable. But SRST has the advantage of being free of such an overlapping problem. Lens L1 and the objective form a 4-f system (see FIG. 1), thus the beam on the sample is the image of the beam after SLM 106. According to Eq. (2), the plane z=0 on the sample is the plane on which the phase $\varphi=\Delta k_z z$ is zero for arbitrary $\Delta k_z$. Since the phase of the central pixel of the phase pattern on SLM 106 is zero for arbitrary $\Delta k_z$, the plane z=0 on the sample is just the image plane of SLM 106. The Bessel beam forms after SLM 106 and hence, the illumination function $I_p(z)>0$ only when z>0. Therefore, the retrieved image in SRST according to example embodiments is distinguishable from the mirror image and the DC component. Furthermore, different from OCT which requires a reference arm outside the samples for generating interferograms, limiting its imaging to the reflection mode only (though applicable for most bioimaging), the OBT-based SRST according to example embodiments are versatile which can be applied for bioimaging in both transmission and reflection modes without the need of an external reference arm, as the interferograms are generated directly inside the samples for 3D tissue imaging in SRST.

An example of the SRST system as described above with reference to FIG. 1 has been built and tested, and also compared with conventional SRS in imaging applications. Some SRST imaging parameters of the system are set up as follows, and it will be appreciated that other parameters may be included and that variations are possible:

(i) Imaging range and step size in $\Delta k_z$ space: In the SRST imaging according to an example implementation, 141 frames of phase patterns are displayed one by one on the SLM 106, which generate 141 beating frequencies $\Delta k_z$ of the Bessel pump beam 104, ranging from 0 to 0.68 $\mu m^{-1}$ with a step size of 0.0049 $\mu m^{-1}$. 141 raw SRS images are acquired sequentially for each phase pattern to form an image stack. Then, the 3D depth-resolved SRST image is rapidly retrieved from the stack of SRS raw images by inverse fast Fourier transform (IFFT).

(ii) Length of Bessel beams in the sample: In the example SRST system, the length of both the pump and Stokes Bessel beams is approximately 200 μm.

(iii) Laser power: The average laser powers on the sample are typically $P_{SRST}$=100 mW for the example SRST system, and $P_{con\text{-}SRS}$=10 mW for conventional SRS, while the corresponding peak power densities are $$I_{SRST} = C\frac{P_{SRST}}{f\tau A} = 5\times 10^{10}\, W\text{cm}^{-2}$$

for SRST, and $$I_{con-SRS} = \frac{P_{cov-SRS}}{f\tau A} = 2\times 10^{11}\, W\text{cm}^{-2}$$

for conventional SRS. Here, $f$=80 MHz is the laser repetition rate; $\tau$=100 $f$s is the pulse width; $A=\pi(d/2)^2=0.7\ \mu m^2$ is the focal spot area, where the radius $$d = \frac{0.61\lambda}{N.A.};\ C = 1/40$$

is a scaling factor, which is the ratio of the length along axial direction between the Gaussian beam and the Bessel beam. The laser power for Bessel beam is spread along the axial direction, hence the peak power density is relatively lower in SRST imaging.

(iv) Imaging time: In an example, the typical pixel dwell times are $\Delta\tau_{SRST}$=45 μs for SRST and $\Delta\tau_{con\text{-}SRS}$=11 μs for conventional SRS. Such a pixel dwell time is chosen in order to maintain a proper signal to noise ratio (SNR) level for good quality of SRST imaging in the samples. For pixel number of 512×512, the 2D raster scan rates are 12 s for SRST imaging and 3 s for conventional SRS imaging. The frame rate of the SLM 106 (PLUTO BB, Holoeye) used is approximately 60 Hz, while the z-motor scan in the microscope is 50 Hz.

Chemical and biological samples used in the example imaging applications include polymethyl methacrylate (PMMA) and polystyrene (PS) beads, 1,4-diphenylbuta-1, 3-diyne (DPBD) crystals, spring onion, pork tissue, and mouse ear.

The first sample for imaging comprises polymethyl methacrylate (PMMA) and polystyrene (PS). In this example, the mixed 10 μm polymethyl methacrylate (PMMA) and polystyrene (PS) beads are embedded in a 2 wt % cured agarose gel phantom for SRST imaging. The beads gel phantom dimension designed is of 2×2×3 $cm^3$, and the scattering mean-free-paths of the pump (800 nm) and Stokes (1040 nm) laser beams in the beads phantom are 65 μm and 55 μm, respectively. PMMA beads give SRS signal at 2950 $cm^{-1}$ (symmetric vibration of C—H in O—$CH_3$ and asymmetric vibration of $CH_2$), while PS beads generate SRS signals at both Raman shifts of 2950 $cm^{-1}$ and 3050 $cm^{-1}$. The SRS intensity ratio of PS at 2950 $cm^{-1}$ and 3050 $cm^{-1}$ is approximately 0.8:1. The SRS signal of agarose gel is much weaker than PS and PMMA at these two Raman shifts due to its low concentration (approximately 2 wt %) used. The SRS images of PMMA beads are obtained by subtracting SRS images at 2950 $cm^{-1}$ to SRS images at 3050 $cm^{-1}$, which are normalized to the SRS intensity ratio.

For example, the scattering mean-free-paths of the pump and Stokes light beams in the polymer beads agarose gel as mentioned above can be estimated based on the Mie scattering model. The concentration $N_{sphere}$ of the mixed beads in the phantom is approximately $10^5$ sphere/$mm^3$; The refractive indices of PMMA and PS at 800 nm (pump beam) are 1.48 and 1.58, respectively ([https://refractiveindex-.info/]). The refractive index of the agarose gel in the phantom is approximately 1.34. To simplify the Mie scattering modeling, it is assumed that the average refractive index of all beads is approximately 1.53. By feeding the above parameters into the Mie scattering computational model [https://omlc.org/calc/mie_calc.html], the Mie scattering cross-section area σ of the beads obtained is 153.77 $\mu m^2$, and the scattering coefficient $\mu_s$ is $\sigma N_{sphere}$=153.77 $cm^{-1}$. Hence, the scattering mean-free-path $$\left(\frac{1}{\mu_s}\right)$$

of the pump beam at 800 nm in the beads gel phantom is approximately 65 μm. Similarly, at 1040 nm (Stokes wavelength), the scattering coefficient $\mu_s$ is calculated to be 181.61 $cm^{-1}$, and thus the scattering mean-free-path $$\frac{1}{\mu_s}$$

of the Stokes beam at 1040 nm in the beads gel phantom is approximately 55 μm.

Figure 3:
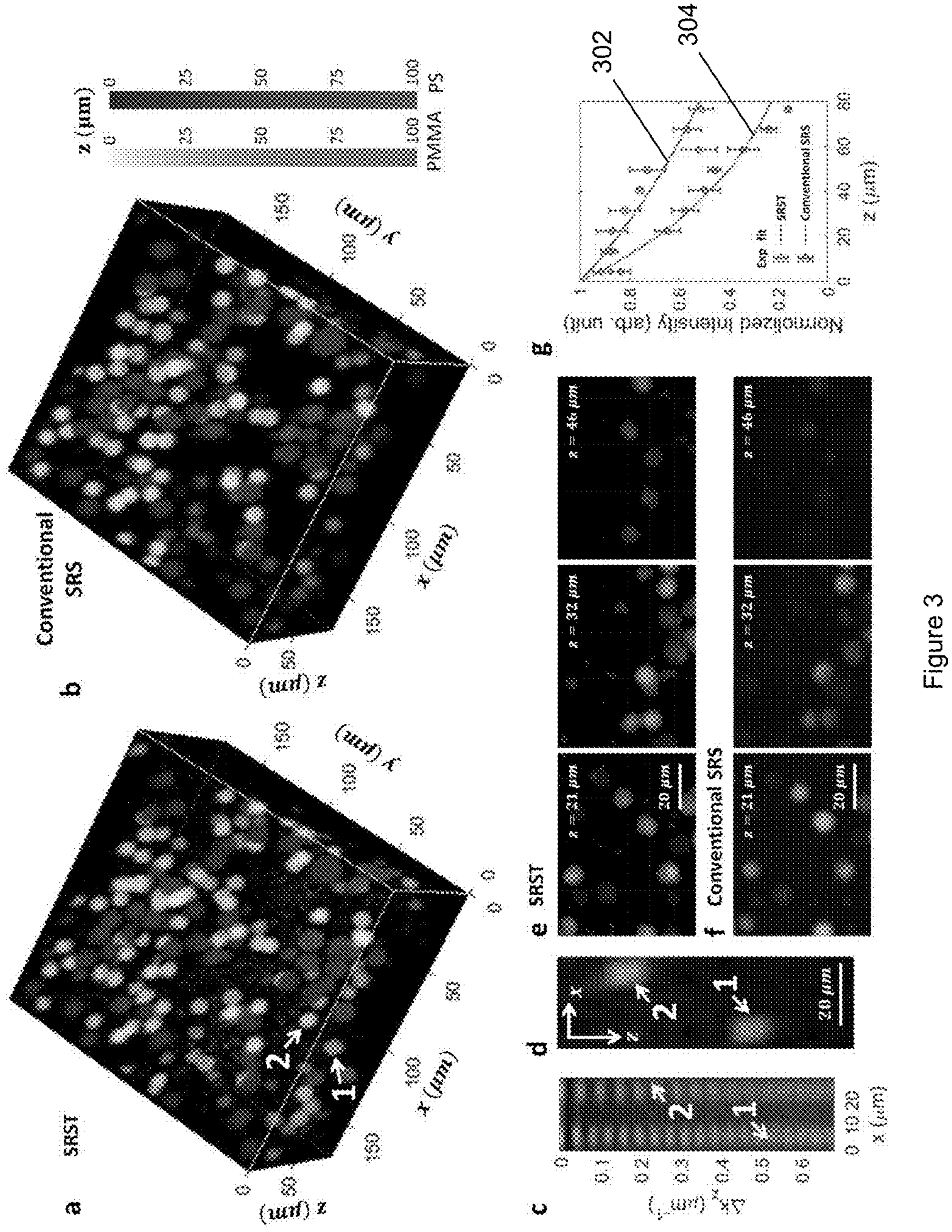
FIG. 3, comprising 3*a*-3*g*, shows performance evaluation of SRST using a sample containing polystyrene (PS) and polymethyl methacrylate (PMMA) beads.

FIG. 3 shows the performance evaluation of the example SRST system based on the SRST of the mixed 10 μm polystyrene (PS) and polymethyl methacrylate (PMMA) beads embedded in the matrix of agarose gel phantom. Chemical selective SRST images and conventional point-scan Gaussian beam SRS images of the mixed 10 μm polystyrene (PS) and polymethyl methacrylate (PMMA) beads embedded in the agarose gel phantom as described above are shown in FIGS. 3*a* and 3*b*, respectively. The z-depth of the beads in the phantom is indicated by using pseudo-color scale. The SRST system according to example embodiments correctly identifies the depth-resolved chemical information about different polymer beads across different phantom depths, which are almost identical to conventional point-scan SRS imaging. To illustrate how the depth information of the beads is determined in SRST, as an example, a deeper bead (bead 1) and a shallower bead (bead 2) in FIG. 3*a* are selected for observation. FIG. 2*c* depicts the measured data in spatial frequency domain along the line drawn across these two beads. It clearly shows that the bead at deeper z oscillates faster along $\Delta k_z$ axis, which is in consistent with the prediction in Eq. (2). FIG. 3*d* shows the retrieved SRST image of bead 1 and bead 2 on x-z plane, confirming the optical sectioning capability of SRST for z-scan-free 3D imaging.

To demonstrate the advantage of SRST technique according to example embodiments for deeper 3D chemical imaging, a cluster of beads in SRST and conventional SRS are displayed in FIGS. 3*e* and 3*f*, respectively. The top layer of this cluster is at about z=21 μm. Comparing the SRST and SRS images at z=32 μm, SRST provides a much stronger SRS signal. At the deeper depth z=46 μm, the beads can still be observed clearly in SRST, and the SRST image brightness level of the beads in the deeper region is only slightly dimmer than that of the shallower beads at z=21 μm and z=32 μm (see FIG. 3*e*). In contrast, the conventional Gaussian beam SRS signal level of the beads at z=46 μm is much weaker than that of the shallower beads (see FIG. 3*f*). The results confirm that the Bessel beams used in SRST imaging are self-reconstructed after bypassing scattering obstacles, which enable SRST technique according to example embodiments to better reach the deeper beads underlying the shadow of other shallower beads in the sample, leading to a deeper tissue imaging.

To quantitatively analyze the imaging depth improvement by Bessel beam OBT-based SRST, FIG. 3*g* shows the normalized SRS intensities of beads at different depths in SRST (line 302) as compared to conventional Gaussian beam SRS microscopy (line 304). The plots are fitted by exponential decay function, $I=I_0 \exp(-z/z_0)$, where $z_0$ is the penetration depth. For SRST, $z_0$=130 μm (95% confidence interval: [77 μm, 183 μm]), while for conventional SRS, $z_0$=58 μm (95% confidence interval: [42 μm, 73 μm]). It can be seen that SRST technique according to example embodiments can provide over 2-fold improvement in penetration depth as compared to conventional SRS microscopy, further affirming the potential of SRST for deeper tissue 3D imaging. This enhancement effect can also be observed clearly by comparing FIG. 3*a* with FIG. 3*b*, where the beads located in the deeper depths (e.g. bead 1) in SRST look much brighter than those in conventional SRS image, proving deeper light penetration of Bessel beam than Gaussian beam in the sample.

Figure 4:
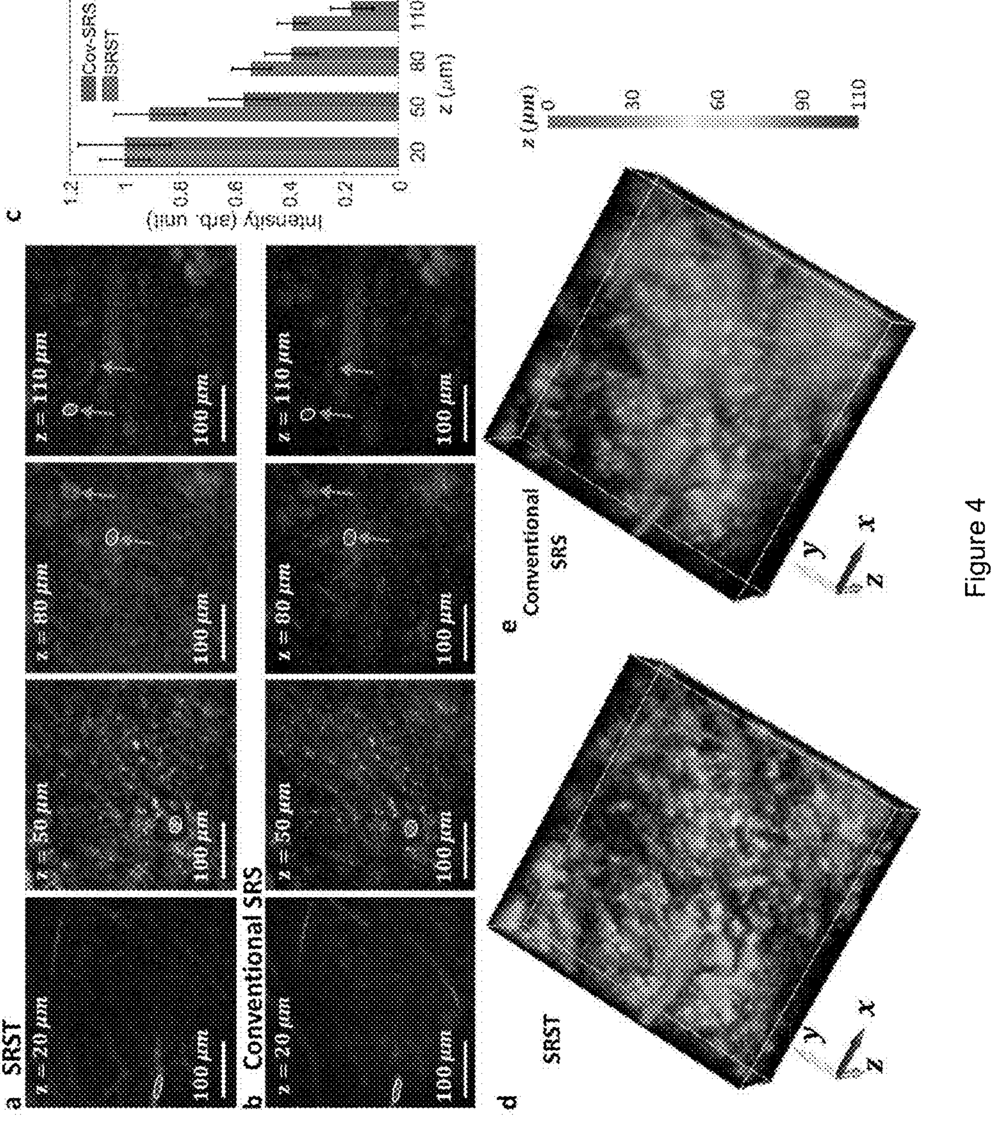
FIG. 4, comprising 4*a*-4*e*, shows performance comparison between SRST and conventional SRS using a sample of mouse ear skin.

The Bessel beam OBT-based SRST system according to example embodiments can also be used for deep tissue imaging in biological samples. For instance, FIGS. 4*a* and 4*b* show the comparison of SRST and conventional SRS images (Raman shift at 2935 $cm^{-1}$ of $CH_3$ stretching of proteins and lipids) of mouse ear skin at different depths. Closer to the skin surface (z=20 μm), lipid-rich sebaceous glands can be seen clearly in both SRST and SRS imaging; while going deeper into the tissue, SRST shows much stronger SRS signals as compared to conventional SRS imaging, e.g., those locations marked by arrows in FIGS. 4*a* and 4*b*. FIG. 4*c* compares the intensities in the selected area (ellipses) in FIGS. 4*a* and 4*b*. The measured intensities from the SRST images at different depth are normalized to the intensity close to the surface (z=20 μm). The intensities from conventional SRS images are normalized in the same way. FIG. 4*c* clearly shows that the intensity of SRST decays much slower than that of conventional SRS with the increased tissue depths, confirming that SRST has a much better capability for deeper tissue imaging. FIGS. 4*d* and 4*e* compare the SRST and conventional SRS 3D images, reflecting that both SRST and conventional SRS give very similar images in the tissue regions closer to the skin surface, but SRST provides much clearer images in the deeper tissue depths.

Figure 5:
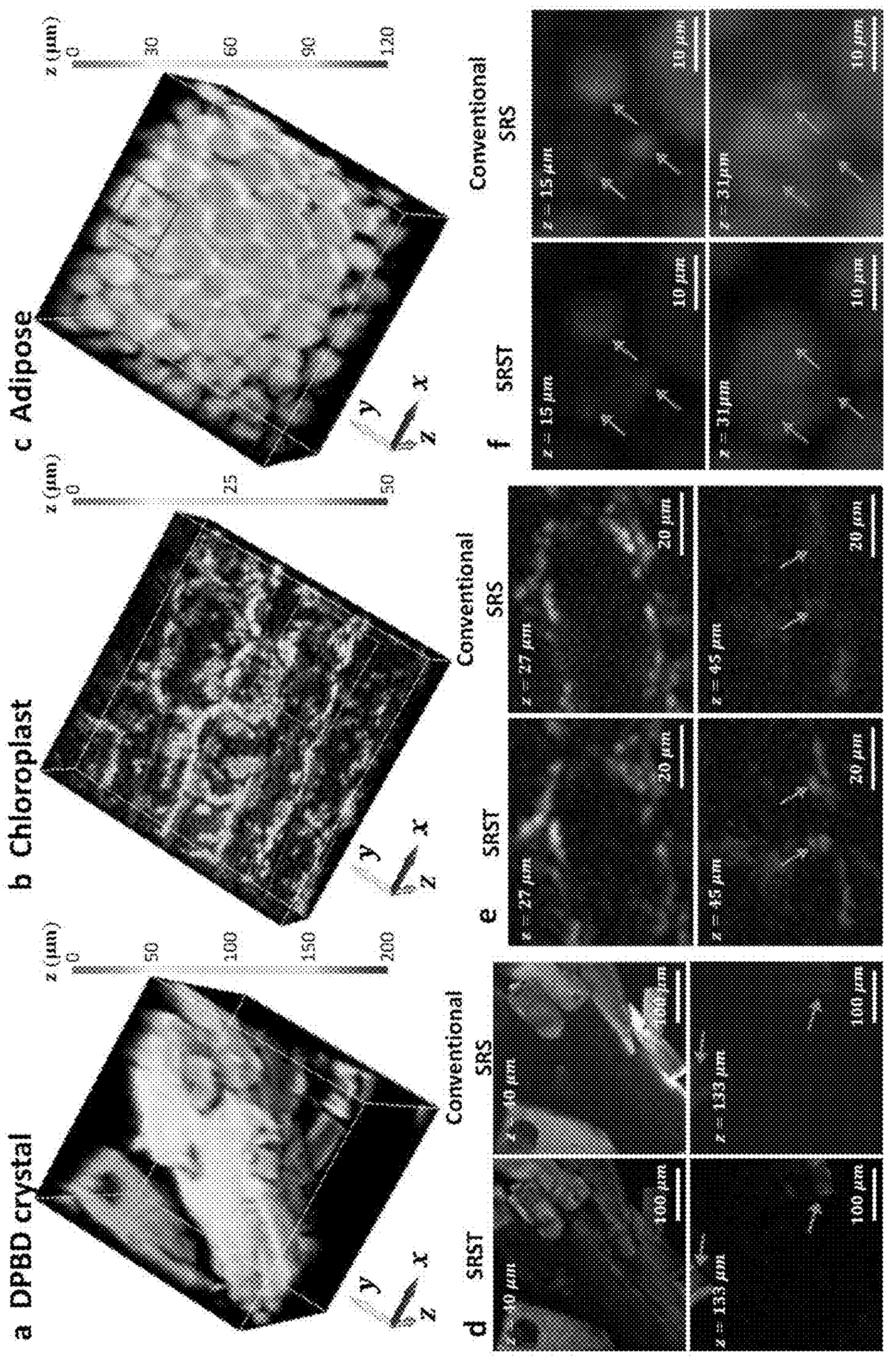
FIG. 5, comprising 5*a*-5*f*, shows performance comparison between SRST and conventional SRS using samples of DPBD crystal, spring onion and pork tissue.

The SRST system according to example embodiments is also used for 3D volumetric deeper molecular imaging on a variety of imaging targets (e.g., biological tissue, Raman-active crystals and plant cells) (FIG. 5). For better visualization, the depth information is presented by using pseudo-color scales as shown in FIGS. 5*a-c*.

FIG. 5*a* shows SRST 3D image of 1,4-diphenylbuta-1,3-diyne (DPBD) crystal (2216 $cm^{-1}$ of C≡C). DPBD is a useful Raman tag widely applied in tracking small molecules in bio-samples and targeting cellular organelles. FIG. 5*d* compares the SRST images based on the system according to example embodiments with conventional point-scan SRS images at two different depths. The crystallites at shallower depths (e.g., z=40 μm) generate similar SRS signal levels between SRST and conventional SRS imaging, while deeper crystallites (marked by arrows) (e.g., z=133 μm) can be found clearly in SRST, but are almost invisible in conventional SRS. SRST shows a much better imaging depth.

FIG. 5*b* displays SRST 3D image at 2935 $cm^{-1}$ of chloroplasts in spring onion (SRST signal at 2935 $cm^{-1}$ contains both the SRS of C—H stretching and two-photon absorption in chlorophylls as described below). Most of the chloroplasts are distributed closer to the plant tissue surface, thereby enabling effective photosynthesis even under the dark environment. FIG. 5*e* compares the SRST images based on the system according to example embodiment with conventional SRS images of the selected area highlighted in a box in FIG. 5*b*. Some chloroplasts (marked by arrows) can be observed clearly in SRST (e.g., z=45 μm), while the corresponding conventional SRS imaging shows almost no signal at the same location. This is probably due to the reason that under Gaussian beam illumination in SRS imaging, those deeper chloroplasts are under the shadow of some shallower chloroplasts (e.g. at z=27 μm); whereas the Bessel beams used in the SRST system according to example embodiments can reach the deeper chloroplasts by bypassing the shallower chloroplasts in the plant cell.

Figure 6:
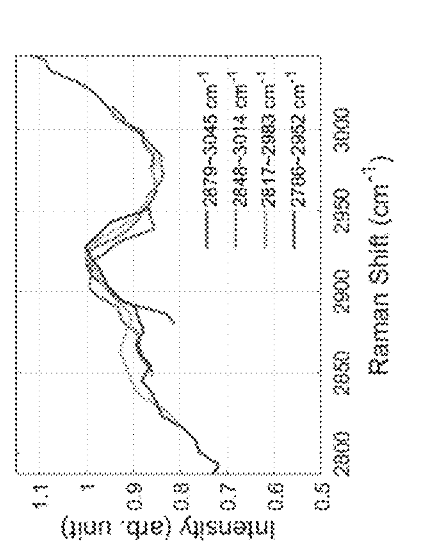
FIG. 6 shows SRS spectrum of chloroplast in spring onion according to an example embodiment.

In this example, the SRS spectrum of chloroplast in spring onion leaf is measured by using a spectral focusing SRS system. Each measurement can cover a spectral range of 166 $cm^{-1}$, thus the central wavelength of the pump beam is shifted four times to cover the entire spectrum range of 2786~3045 $cm^{-1}$. The Raman peaks at 2900~2950 $cm^{-1}$ are clearly observed in all the four measurements (see FIG. 6), corresponding to the $CH_3$ vibration. $CH_3$ groups are commonly observed in different types of chlorophyll. In addition, a strong non-chemically-specific two-photon absorption background (about 70% of the Raman peak intensity) is also observed. Beyond 3000 $cm^{-1}$, the signal increases due to the SRS signal from water.

FIG. 5*c* gives another example of SRST 3D imaging (2845 $cm^{-1}$ of $CH_2$ of lipids) of adipose in a pork tissue. The 3D morphology and distributions of lipid droplets which play a key role in cell and tissue physiology (e.g., energy storage) can be observed clearly even in the deeper tissue areas in SRST imaging. FIG. 5*f* compares the SRST images based on the system according to example embodiments with conventional SRS images of the selected area labeled by a box in FIG. 5*c*. For instance, at z=15 μm, there are three small lipid droplets marked by arrows. In conventional SRS imaging with Gaussian beams illumination, the light shadows create artefacts (also marked by arrows) in the deeper lipid droplets (e.g., z=31 μm), but no such artefacts are observed in SRST imaging due to the benefit of self-reconstructing properties of Bessel beam propagation in tissue. The above results further substantiate that the Bessel beam OBT-based SRST according to example embodiments is a powerful label-free 3D molecular imaging tool for volumetric deeper tissue imaging in biological and biomedical systems.

The axial and transverse resolutions between SRST according to example embodiment and conventional SRS imaging is also compared. In SRST, the depth resolution is determined by Eq. (4), while the range of $\Delta k_z$ is calculated by Eq. (5). In the SRST imaging according to example embodiments, $r_1$ is fixed, corresponding to N.A.=n sin(α)=0.54, $r_2$ is varying from 0.5 $r_1$ to $r_1$, corresponding to N.A.=n sin(β) from 0.27 to 0.54, where n=1.33 is the refractive index of tissue used (close to water refractive index). Thus, the range of $\Delta k_z$ is 0~0.68 $\mu m^{-1}$, for $\lambda_p$=800 nm. Since F(x, y, $\Delta k_z$) is an even function of $\Delta k_z$, the effective beating frequency range of $\Delta k_z$ for imaging retrieval can be varying from −0.68 to 0.68 $\mu m^{-1}$, which is corresponding to the depth resolution of 5.6 μm in SRST imaging. This predicted SRST depth resolution is in agreement with the measured depth resolution of 5.49 μm (see calculation below). In comparison with conventional point-scan SRS with the same N.A.=0.54 used, the full widths at half maximum (FWHMs) of the Airy disk along the axial direction ($2\lambda/N.A.^2$) are 5.5 μm and 7.1 μm for $\lambda_p$=800 nm and $\lambda_S$=1041 nm, respectively. The depth resolution is approximately $$4.3\ \mu m\left(=\frac{1}{\sqrt{1-(5.5\ \mu m)^2+1/(7.1\ \mu m)^2}}\right)$$

in conventional SRS imaging. On the other hand, the non-diffracting Bessel beam size in the transverse direction can be squeezed down to approximately 1.33-fold smaller than the transverse resolution (approximately 0.90 μm) of Gaussian beam ($\lambda_p$=800 nm, N.A.=0.54) in the samples. Therefore, the SRST imaging according to example embodiments shares a similar axial resolution with conventional SRS, but has a higher transverse resolution for achieving label-free 3D volumetric deep tissue imaging with subcellular resolution.

Figure 7:
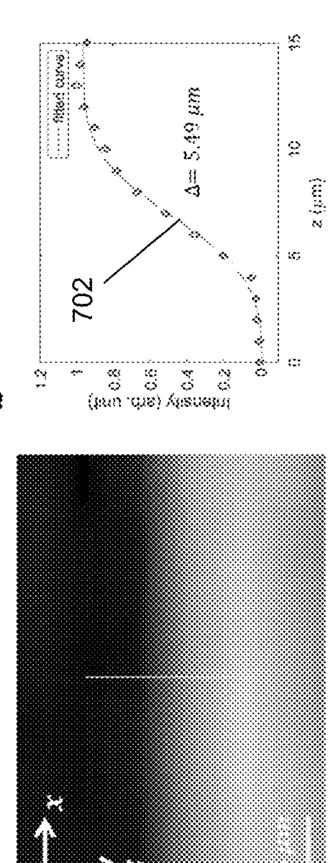
FIG. 7, comprising 7*a*-7*b*, shows an example method of axial resolution measurement.

FIG. 7*a* shows the SRST image of DPBD crystals immersed in water in x-z plane. FIG. 7*b* shows the intensity profile across the crystal and water interface along the white line shown in FIG. 7*a*. The data is fitted by using an error function $$\left(h(x)=A_1\int_{-\infty}^{X}\exp\left(-t^2/z_0^2\right)dt+A_2\right),$$

where $A_1$, $A_2$, and $z_0$ are the fitting parameters. The fit result is plotted as curve 702. The axial resolution can be defined as the FWHM of the Gaussian function inside the fitting function h(x), i.e., the resolution $\Delta=2\sqrt{\ln 2}z_0$=5.49 μm, as indicated in the intensity profile and discussed above.

Figure 8:
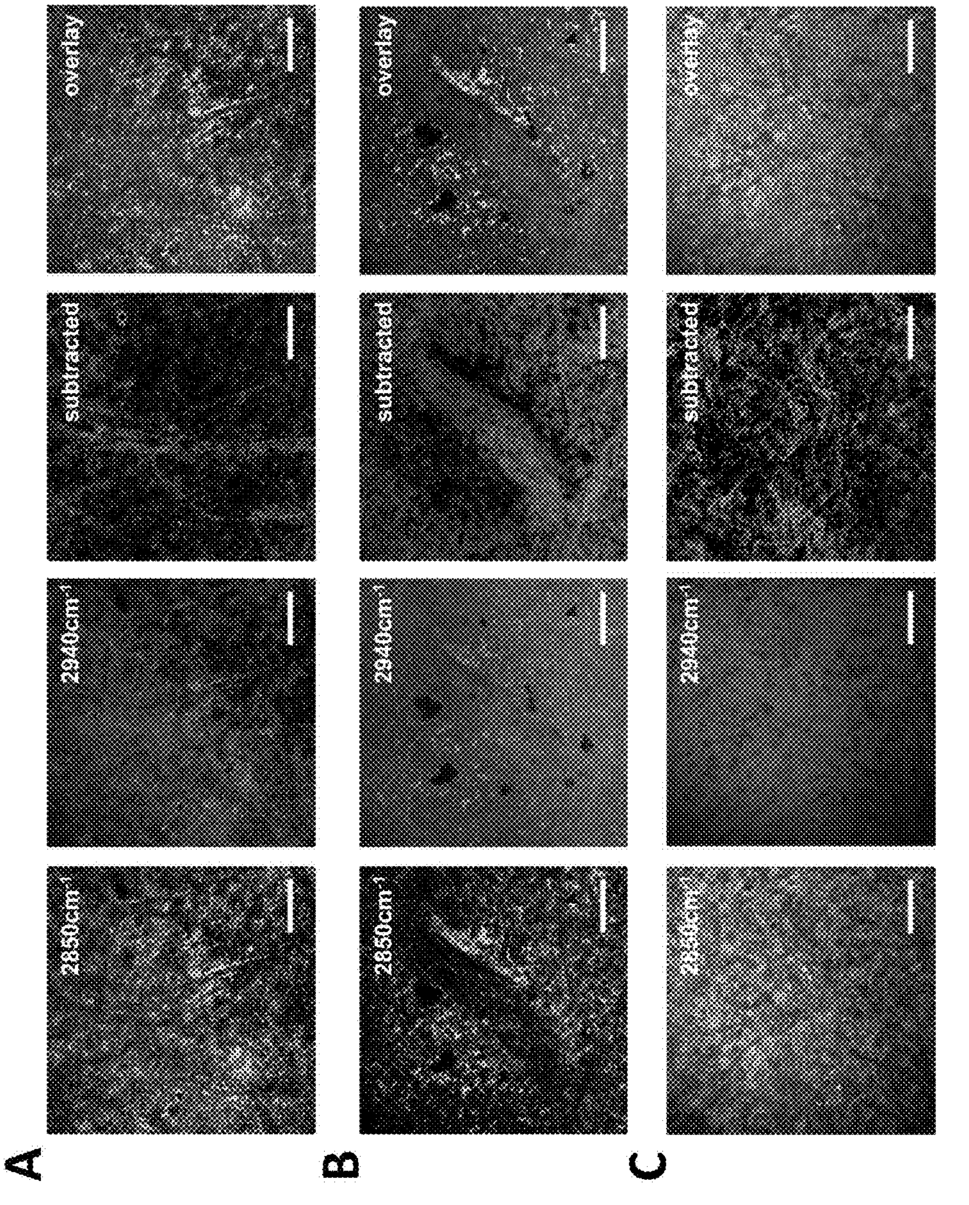
FIG. 8, comprising 8A-8C, shows representative epi-detected hyperspectral SRS images for classical, mesenchymal and proneural GBM tissues respectively.

The epi-detected SRST technique according to example embodiments can also be applied for rapid, label-free molecular assessment of intratumoral heterogeneity and molecular subtyping in the whole glioblastoma (GBM) tissue specimens with submicron resolution. FIGS. 8A-8C show the representative SRS images of the three GBM subtypes (classical, mesenchymal and proneural respectively) acquired at the Raman shifts of 2850 and 2940 $cm^{-1}$ within a fraction of seconds, using the SRST system according to example embodiments. Each Raman shift provides a distinct biomolecular distribution, where at 2850 $cm^{-1}$, lipid distributions in GBMs are visualized due to the symmetric stretching of $CH_2$ bonds of the lipid molecules (first column in FIG. 8), while the resonance to the Raman shift of 2940 $cm^{-1}$ due to the stretching of $CH_3$ bonds in both the lipids and proteins gives rise to the uniform brightness of the tissues (second column). To increase the specificity to the proteins, the SRS image at 2850 $cm^{-1}$ is subtracted from 2940 $cm^{-1}$ to highlight protein distributions (third column). Further, the 2850 $cm^{-1}$ and subtracted images are overlaid to depict the cellular morphology including myelins (last column). In general, it can be observed that the myelin density and integrity are decreasing in the proneural-classical-mesenchymal order, suggesting the stain-free histologic potential of SRST imaging technique for rapid GBM molecular subtypings.

The SRS imaging results show that both the stain-free SRST histological images and 2D subtype maps can be obtained within 20-30 minutes. It will be appreciated that the time taken can be shortened further in alternate embodiments, for example, by using a faster scanner. Such performance is superior to the conventional single-cell RNA sequencing. While the SRS histology results assess demyelination status as a new diagnostic feature, the heterogeneity mapping uncovers a novel insight into the intratumoral heterogeneity. While the major proportions of GBM tissues agree with the diagnostic results of the genomic analysis, non-trivial portions of the remaining image tiles in the specimens are found belonging to the other molecular subtypes, implying the substantial degree of GBM heterogeneity uncovered by label-free SRS imaging.

Figure 9:
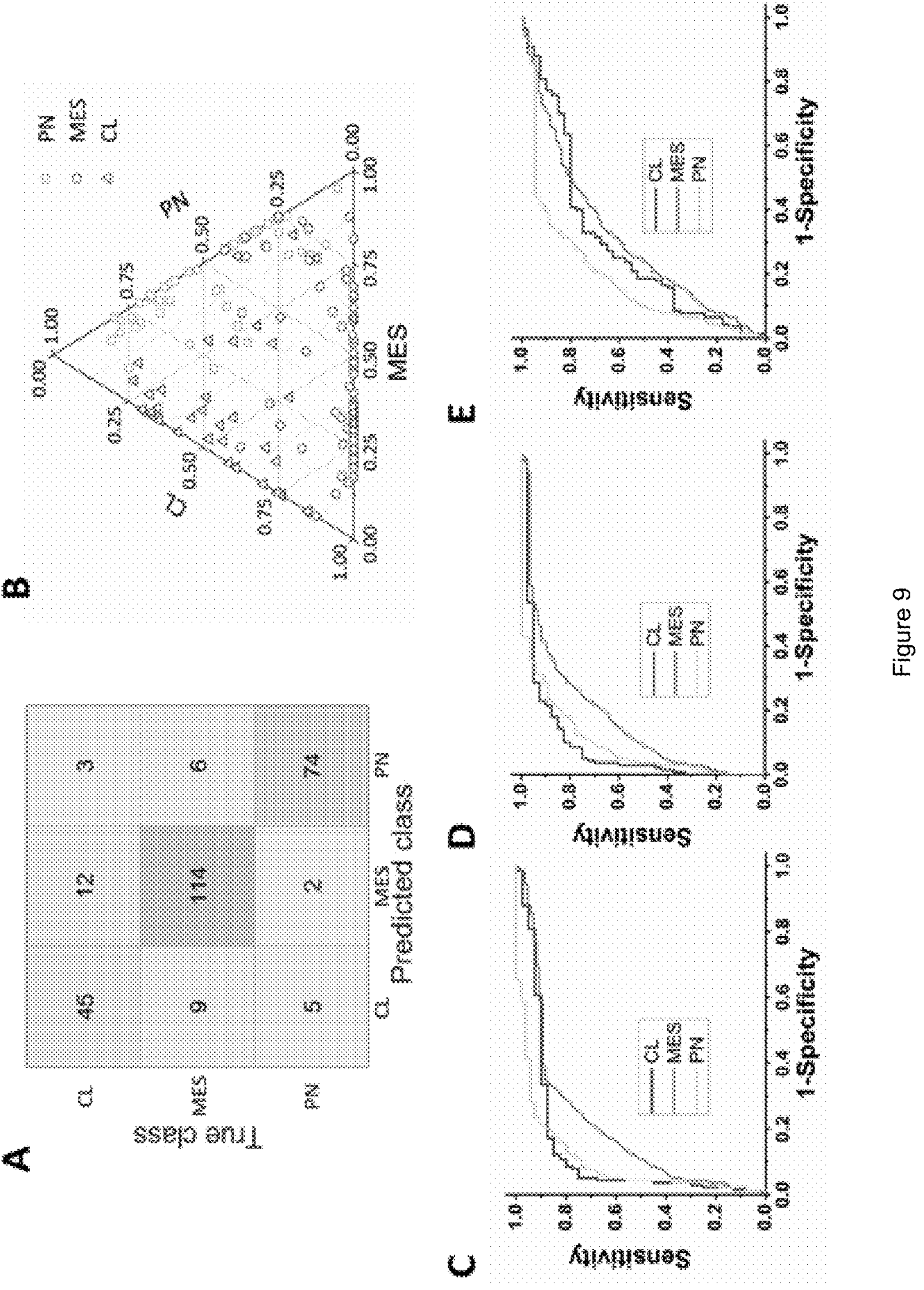
FIG. 9, comprising 9A-9E, shows an illustration of SRST diagnosis of the GBM subtypes using a deep learning algorithm.

In a further implementation, the SRS spectra retrieved from hyperspectral SRS imaging on each GBM tissue are investigated with deep-learning algorithms for GBM molecular subtypings. Each image tile of the whole tissue image generates a single spectrum by averaging out the 512×512 pixels for comparison among the subtypes. In general, there is a decrease in $CH_2$ and $CH_3$ stretching peak (2850 & 2940 $cm^{-1}$) in MES-CL-PN order. On the contrary, the protein spectra of the GBM subtypes resemble each other, suggesting the relatively low diagnostic information embedded. To verify whether the SRS spectroscopic information from SRS imaging can yield significant diagnostic performance for GBM subtyping, the SRS spectra are provided to the quadratic support vector machine model. The hand-out validation with 80/20 ratio for train and validation sets gives the diagnostic accuracy of 80.6% as shown in the confusion matrix (FIG. 9A). The robustness of the deep-learning diagnostic model is further confirmed by the receiver-operating characteristic (ROC) curve with the average area integration of approximately 0.89 (FIGS. 9C-9E). Hence, the deep-learning algorithms developed in this implementation may be further extended to SD-SRST 3D imaging for stain-free brain tumor diagnosis and tumor margins demarcation for precision neuro-surgery.

Figure 10:
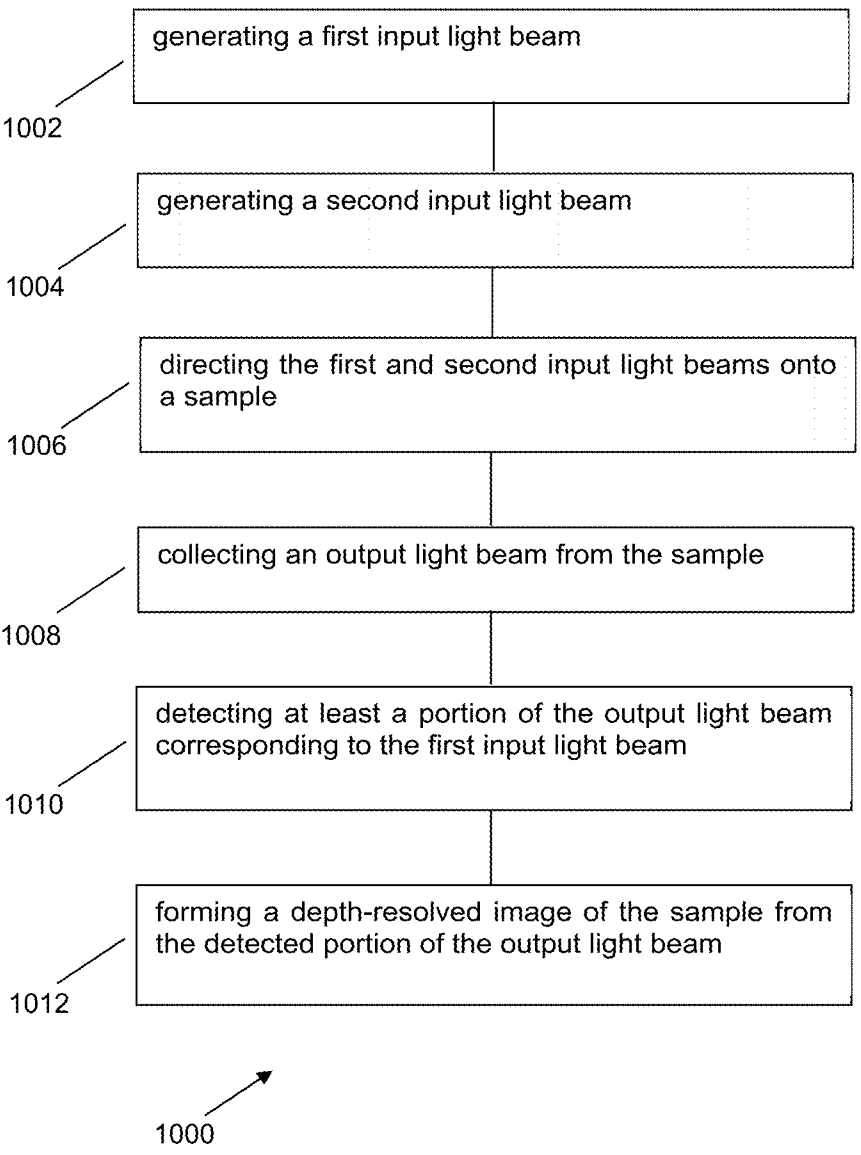
FIG. 10 shows a flow chart illustrating a SRST method according to an example embodiment.

FIG. 10 shows a flow chart of a stimulated Raman scattering tomography method according to an example embodiment. At step 1002, a first input light beam is generated. The first input light beam is phase-modulated. At step 1004, a second input light beam is generated. The second input light beam is amplitude-modulated. At step 1006, the first and second input light beams are directed onto a sample. At step 1008, an output light beam from the sample is collected. At step 1010, at least a portion of the output light beam corresponding to the first input light beam is detected. At step 1012 a depth-resolved image of the sample is formed from the detected portion of the output light beam.

As discussed above, the challenges in conventional 3D volumetric imaging, e.g., (i) the need of fluorescent labelling (confocal fluorescent microscopy) which may perturb pathophysiological environments in live cells and tissue and (ii) shorter imaging depths due to the scattering of the focused Gaussian beam illumination in turbid tissue, have hampered their wide applications for rapid dynamic and functional 3D imaging in biological systems. The z-scan-free stimulated Raman scattering tomography (SRST) based on Bessel beam-optical beating technique (OBT) according to example embodiments can solve the above problems to achieve label-free volumetric deeper tissue imaging. In example embodiments, without a need of a mechanical scan of laser focusing across the tissue depth but by electronically varying the phase patterns projected on the pump beam through an SLM, the optical beating patterns of the pump beam for optical sectioning can be rapidly generated due to the interference of the two overlapping Bessel beams in the sample. The superposition of the beating Bessel pump beams and the Bessel Stokes beam in the sample generates the depth-encoded SRS for 3D SRS imaging. Hence, the depth-resolved 3D chemical distributions about the volumetric sample with a subcellular resolution can be rapidly retrieved by implementing IFFT.

The examples described above have demonstrated the utility of the present Bessel beam OBT-based SRST technique to enable volumetric deeper chemical imaging in a number of samples (e.g., polymer beads (PMMA and polystyrene) embedded in agarose gel, Raman-active crystals, plant cells, and biological tissue (mouse ear skin, pork tissue). To improve the 3D SRS imaging depth, the non-diffracting zero-order Bessel beams as pump and Stokes beams are employed for OBT-based SRST imaging, which exhibit a self-reconstructing property beyond the obstacles encountered along the optical path with a remarkable resilience to scattering effects in turbid media. The unique self-reconstructing capability of Bessel beam propagation has been demonstrated for deeper 3D chemical imaging by SRST, which have been clearly shown in the examples described above. These examples confirms self-healing of Bessel beam propagation after obstacles, thereby illuminating the molecules beneath the obstacle shadows, eliminating the shadow artefacts in SRS imaging, and a relatively lower energy loss by the Bessel beam when propagating in highly scattering media with scattering resilience properties. As a result, the Bessel beam OBT-based SRST imaging according to example embodiments can lead to advances in deeper biomedical imaging, where the diffraction and scattering in turbid media prevent the formation of a tight focus by using conventional Gaussian beams SRS microscopy.

It will be appreciated that SRST is essentially a multiplexing detection technique (i.e., the raw image data is acquired as projection image, rather than the layer by layer scanning), which can improve the SNR of the retrieved image due to Fellgett advantage, provided that the noise is independent of the samples. Indeed, the noise of SRS according to example embodiments is independent of the samples, because SRS is limited by the shot noise of the excitation laser beam, which is an inherent property of the laser source. In the example shown in FIG. 3, the SNR is improved by 5.3 times from the raw data to the retrieved SRST. The final SNR of the retrieved SRST image is not affected by the solvent background in the samples in SRST imaging.

Figure 11:
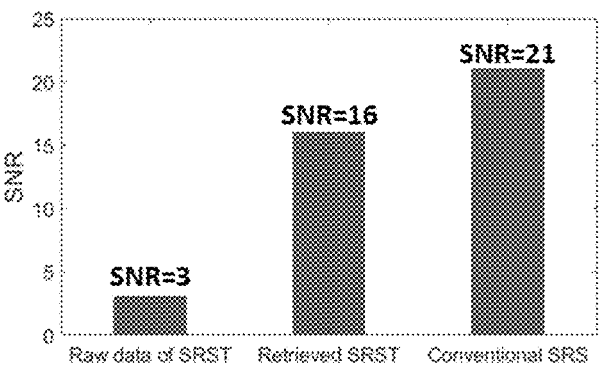
FIG. 11 shows a comparison of SNR among the raw SRST image, the retrieved SRST image, and the conventional SRS according to an example embodiment.

As an illustration, FIG. 11 compares the signal-to-noise ratios (SNR) of the raw data in SRST, the retrieved SRST image (FIG. 3*a*) and the conventional SRS of the beads (FIG. 3*b*). It shows that the SNR is improved by approximately 5.3 times from the raw data (SNR=3) to the retrieved SRST (SNR=16) due to Fellgett advantage. The SNR of the retrieved SRST is comparable to the SNR of the conventional SRS imaging (SNR=21), although in SRST 4 times lower peak power density were, leading to 16 times weaker local signal; but 10 times higher average power, leading to $\sqrt{10}$ higher noise.

Figure 12:
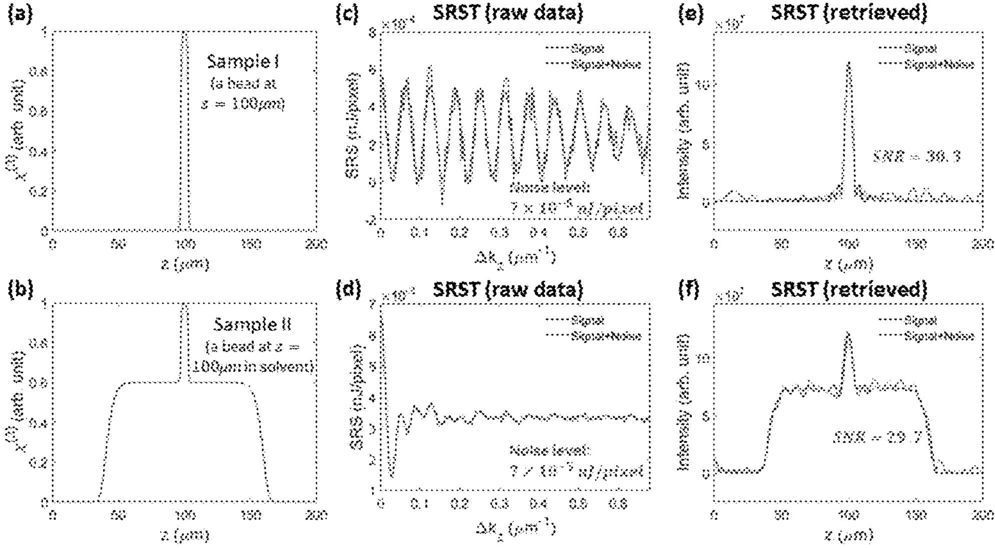
FIG. 12, comprising 12(*a*)-12(*f*), shows simulation results of SNR of SRST in a solvent with strong background.

To illustrate that the solvent background signal does not deteriorate the SNR of SRST imaging, the SRS simulation results are shown in FIG. 12. Specifically, the two different samples used in simulations are shown in FIGS. 12*a*-12*b*, respectively: Sample I is a bead at z=100 μm without solvent, while sample II is the same bead in solvent (solvent spanning from 40~160 μm, solvent background signal level is 60% of the bead). The raw data (projection image) in SRST records the SRS signal of both samples in $\Delta k_z$ space (Fourier domain), as plotted in FIGS. 12*c*-12*d*, respectively. FIGS. 12*e*-12*f* show the intensity profile of the retrieved SRST image along z-axis, which is obtained via inverse fast Fourier transform (IFFT) of the curves plotted in FIGS. 12*c*-12*d*, respectively. In FIGS. 12*c*-12*f*, the one set of curves stand for the pure bead SRS signal, while the other set of curves represent the pure bead SRS signal+noise.

The noise in the raw data shown should be independent of the samples. In some implementations, the same Poisson noise ($7\times10^{-5}$ nJ/pixel) is added in FIGS. 12*c* and 12*d*. The signal level is much higher in FIG. 12*d* (approximately $7\times10^{-3}$ nJ/pixel) than that in FIG. 12*c* (approximately $5\times10^{-4}$ nJ/pixel), as solvent generates much stronger background signal in projection image. Finally, the SNR of the retrieved SRST images (FIG. 12*e*-12*f*) are almost the same, proving that solvent with strong SRS background signal does not affect the final SNR of SRST imaging.

It will be appreciated that under the Bessel beam illumination in SRST, the laser power is spread along the axial direction (about 200 μm example embodiments). Thus, SRST needs to have a much higher total laser power in order to achieve the same local power density on the sample as compared to conventional Gaussian SRS imaging. Since the photo-damage depends mainly on the local power density rendered on the sample, using a higher total power in SRST imaging does not damage the sample. In present SRST examples, the total laser power on the sample in SRST (100 mW) is approximately 10-fold higher than that in conventional SRS (10 mW) without causing photo-damage to the samples. On the other hand, obvious photo-damage is observed in conventional SRS if total power is more than about 30 mW.

It is expected that SRST would be able to significantly improve the imaging speed in a modified imaging mode: the so-called frequency domain-SRST (FD-SRST). This can be explained as follows: according to Eq. (5), a broadband laser source $\lambda_p$ with multiple wavelength components $\Delta\lambda_p$ can be used to generate multiple $\Delta k_z$. Hence, in FD-SRST, SRS signal can be detected by a spectrometer, in which a spectrum is recorded in each pixel, and the depth information can be readily uncovered through the acquired spectrum with IFFT. 3D image can be rapidly obtained by performing 2D raster-scan once only. Therefore, the 3D imaging speed can be as fast as 2D imaging. In such embodiment, both the pump and Stokes Bessel beams should be broadbands. At the same time, both beams should be chirped, so that spectral focusing technique can be applied to select a particular Raman peak even under broadband excitation for rapid 3D SRS imaging.

It will be appreciated that the z-scan-free optical sectioning property of the Bessel beam-OBT method according to example embodiments is not unique to SRST 3D imaging only, but universal. The OBT method as described can be readily adapted to practically any other nonlinear optical imaging modalities for rapid 3D tissue imaging. For example, the current OBT-based SRST system is ready for coherent anti-Stokes Raman scattering (CARS) tomography by replacing the photodiode with a photomultiplier tube (PMT) to collect 3D CARS signal from deeper tissue regions. If only using the pump beam or Stokes beam alone in SRST imaging system, the OBT-SRST technique can be simplified to second/third harmonic generation (SHG/THG) tomography, fluorescence tomography, and multiphoton tomography. Furthermore, Bessel beam-OBT method in SRST imaging is also compatible with super-resolution microscopy techniques, such as stimulated emission depletion (STED) microscopy, saturated stimulated Raman scattering microscopy, and higher-order coherent Raman scattering microscopy (if a high N.A. objective is used) for realizing rapid super-resolution 3D deeper tissue imaging.

In summary, the example embodiments provide a z-scan-free stimulated Raman scattering tomography (SRST) which is enabled by using optical beating technique (OBT) coupled with self-reconstructing Bessel beams for achieving deeper penetration in label-free volumetric chemical imaging with subcellular resolution. Without a need of a mechanical scan along the axial direction, the depth-resolved SRS signals about the volumetric tissue are encoded in the spatial frequency domain through electronically tuning the optical beating frequency of the Bessel pump beam with a phase modulator and hence, the depth-resolved SRST can be retrieved by implementing IFFT for 3D SRS imaging. The example embodiments also illustrate that Bessel beam OBT-based SRST imaging provides at least 2-fold improvement in imaging depth in highly scattering media as compared to conventional point-scan Gaussian beam-SRS microscopy. The utilities of SRST technique for label-free volumetric deeper molecular imaging are demonstrated on a variety of samples (e.g., Raman-active crystals, biological tissue, and plant cells), which are superior to conventional SRS microscopy in terms of penetration depth. The generality of z-scan-free optical sectioning ability of Bessel beam-OBT method in SRST can be readily extended to practically any other nonlinear optical imaging modalities for deep tissue volumetric 3D imaging in biological and biomedical systems. Therefore, the powerful Bessel beam-OBT method in SRST for z-scan-free optical sectioning may have a significant impact on the entire field of advanced 3D microscopy imaging applications.

It will be appreciated by a person skilled in the art that numerous variations and/or modifications may be made to the present invention as shown in the specific embodiments without departing from the scope of the invention as broadly described. The present embodiments are, therefore, to be considered in all respects to be illustrative and not restrictive.

The invention claimed is:

1. A stimulated Raman scattering tomography system comprising:

a laser light source configured to provide a first output and a second output, wherein the first output is configured to generate a first input light beam, wherein the first input light beam is phase-modulated;

wherein the second output is configured to generate a second input light beam, wherein the second input light beam is amplitude-modulated; and wherein the first input light beam and the second input light beam are configured to be form collinear Bessel beams, the collinear Bessel beams configured to generate an axial optical beating pattern comprising a plurality of axial spatial-frequency components along an axial direction;

an objective configured to direct the collinear Bessel beams onto a sample, wherein depth information of the sample is encoded into the plurality of axial spatial-frequency components of the optical beating pattern;

a condenser configured to collect an output light beam from the sample;

a detector configured to detect at least a portion of the output light beam corresponding to the first input light beam; and a lock-in amplifier configured to demodulate the detected portion of the output light beam from the sample for forming a depth-resolved image of the sample from the detected portion of the output light beam, wherein the depth-resolved image is formed based on the encoded axial spatial-frequency components without scanning a focal spot of the first or second input light beam across a depth direction of the sample.

2. The system as claimed in claim 1, wherein the laser light source comprises a broadband femtosecond laser light source.

3. The system as claimed in claim 1, wherein the first input light beam comprises a pump beam and the second input light beam comprises a Stokes beam.

4. The system as claimed in claim 3, further comprising a spatial light modulator for phase-modulating the pump beam based on a predetermined phase pattern, wherein the predetermined phase pattern defines an axial beating profile configured to generate the plurality of axial spatial-frequency components of the collinear Bessel beams.

5. The system as claimed in claim 3, further comprising an electro-optic modulator for amplitude-modulating the Stokes beam at a predetermined frequency.

6. The system as claimed in claim 1, further comprising a bandpass filter set positioned after the condenser and configured to spectrally isolate the portion of the output light beam corresponding to the first input light beam.

7. The system as claimed in claim 1, wherein the lock-in amplifier is configured to extract a modulated signal from the detected portion of the output light beam, and wherein the extracted signal is demodulated using an inverse fast Fourier transform to obtain depth-resolved information, and wherein the inverse fast Fourier transform is applied to the plurality of axial spatial-frequency components encoded in the optical beating pattern.

8. The system as claimed in claim 1, wherein the output light beam comprises a reflected beam portion and a transmitted beam portion from the sample, wherein the transmitted beam portion is detected.

9. A stimulated Raman scattering tomography method comprising:

generating a first input light beam, wherein the first input light beam is phase-modulated;

generating a second input light beam, wherein the second input light beam is amplitude-modulated;

forming the first input light beam and the second input light beam into collinear Bessel beams, the collinear Bessel beams configured to generate an axial optical beating pattern comprising a plurality of axial spatial-frequency components along an axial direction;

directing the collinear Bessel onto a sample, wherein depth information of the sample is encoded into the plurality of axial spatial-frequency components of the optical beating pattern;

collecting an output light beam from the sample;

detecting at least a portion of the output light beam corresponding to the first input light beam; and forming a depth-resolved image of the sample from the detected portion of the output light beam, wherein the depth-resolved image is formed based on the encoded axial spatial-frequency components without scanning a focal spot of the first or second input light beam across a depth direction of the sample.

10. The method as claimed in claim 9, wherein the first input light beam comprises a pump beam and the second input light beam comprises a Stokes beam.

11. The method as claimed in claim 10, wherein the pump beam is phase-modulated based on a predetermined phase pattern using a spatial light modulator, wherein the predetermined phase pattern defines an axial beating profile configured to generate the plurality of axial spatial-frequency components of the collinear Bessel beams.

12. The method as claimed in claim 10, wherein the Stokes beam is amplitude-modulated at a predetermined frequency using an electro-optic modulator.

13. The method as claimed in claim 9, wherein forming the depth-resolved image of the sample comprises extracting a modulated signal from the detected portion of the output light beam from the sample using a lock-in amplifier and applying an inverse fast Fourier transform to reconstruct the depth-resolved image of the sample, and wherein the inverse fast Fourier transform is applied to the plurality of axial spatial-frequency components encoded in the optical beating pattern.

14. A three-dimensional volumetric imaging method comprising the method as claimed in claim 9.

15. The three-dimensional volumetric imaging method as claimed in claim 14, wherein the sample is label-free.

* * * * *